United States Patent [19]  [11] 3,969,738
Johnson et al.  [45] July 13, 1976

[54] EXPOSURE CONTROL SYSTEM WITH INERTIAL CHARACTERISTIC

[75] Inventors: Bruce K. Johnson, Andover; George D. Whiteside, Lexington, both of Mass.

[73] Assignee: Polaroid Corporation, Cambridge, Mass.

[22] Filed: May 5, 1975

[21] Appl. No.: 574,695

[52] U.S. Cl.................................. 354/230; 354/29; 354/235; 354/256
[51] Int. Cl.²....................... G03B 9/08; G03B 9/58
[58] Field of Search.................. 354/226, 228–230, 354/234–235, 26, 29, 30, 256, 259–260

[56] References Cited
UNITED STATES PATENTS

| | | | |
|---|---|---|---|
| 3,251,288 | 5/1966 | Kitai | 354/259 |
| 3,722,392 | 3/1973 | Kitai | 354/259 X |
| 3,856,393 | 12/1974 | Ogihara et al. | 354/230 |
| 3,856,393 | 12/1974 | Ogihara et al. | 354/230 X |
| 3,873,987 | 3/1975 | Brauning et al. | 354/230 |

*Primary Examiner*—L. T. Hix
*Assistant Examiner*—James LaBarre
*Attorney, Agent, or Firm*—Edward S. Roman

[57] ABSTRACT

An exposure control system for photographic apparatus includes inertial means for selectively presenting an inertial characteristic to influence the movement of the exposure control system shutter blade elements. The inertial characteristic influences the rate of movement of the shutter blade elements toward their maximum aperture defining position without influencing the return movement of the shutter blade elements toward their closed position. The inertial means is also thereafter automatically reset in readiness for the next photographic cycle.

9 Claims, 4 Drawing Figures

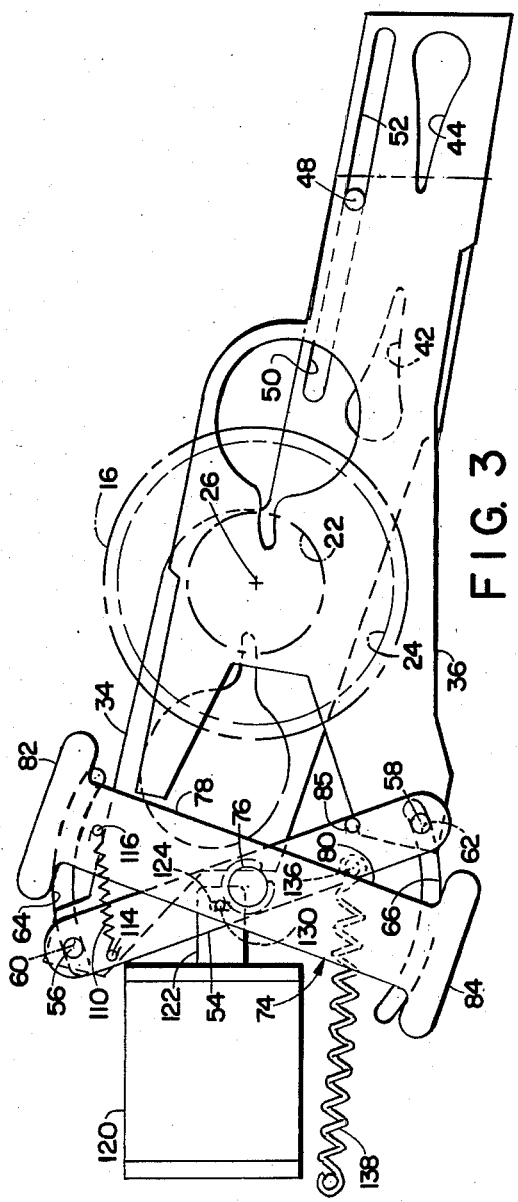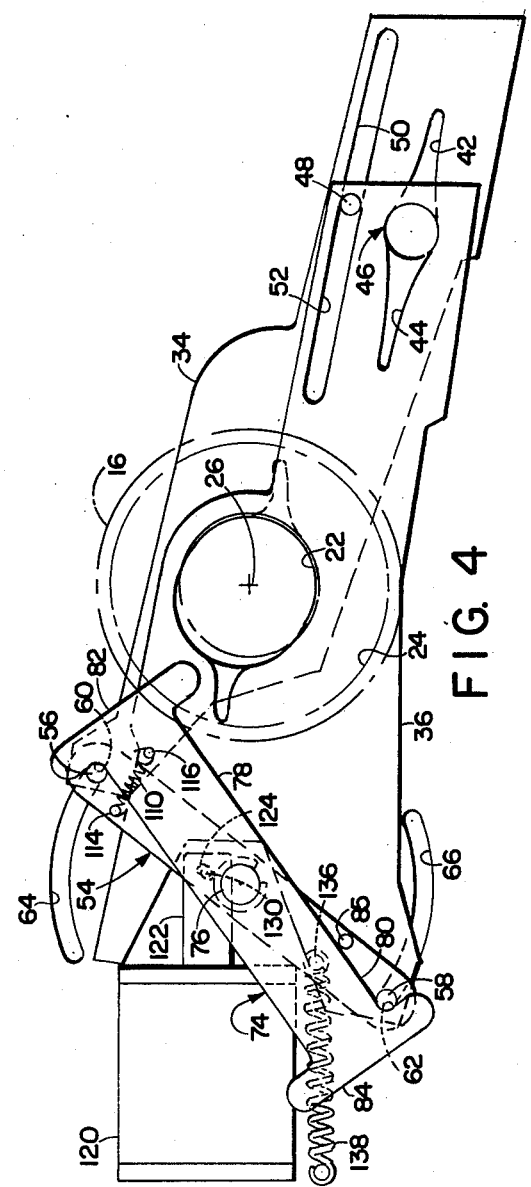

EXPOSURE CONTROL SYSTEM WITH INERTIAL CHARACTERISTIC

BACKGROUND OF THE INVENTION

1. Field of the Invention

This invention relates generally to an exposure control system with inertial means for a photographic apparatus and more particularly to an exposure control system with a selectively presentable inertial characteristic for more precisely controlling the rate of effective aperture opening in a photographic apparatus.

2. Description of the Prior Art

Exposure control systems for photographic apparatus conventionally embody light weight shutter blade elements with scene light admitting apertures therethrough. Shutter blade elements of this type may be moved in directions which operate to progressively enlarge and decrease the effective scene light admitting aperture that is defined by the overlapping scene light admitting apertures. The rate at which the blade elements are moved determines the rate at which the effective aperture decreases and increases, and has a direct influence on the achievable depth of field. Thus, in order to increase the depth of field, it is desirable to precisely control the speed of the shutter blade elements as they are moved in the direction of progressively increasing effective aperture size. Such shutter blade elements are often moved toward the open position through the influence of a biasing spring, the output force characteristic of which controls the speed at which the shutter blade elements move. For exposure control systems embodying light weight shutter blade elements as well as other moving components, it is necessary to utilize a substantially light biasing spring to achieve the desired slow rate of shutter blade opening. However, in such a light weight exposure control system of the above-described type, where the actuating force is small, the frictional forces between moving components becomes a significant part of the overall force which must be overcome by the biasing means. These frictional forces also tend to vary with shutter blade movement and thus cause a jerking movement of the shutter blades which is highly undesirable. An increase in the output force characteristic of the biasing spring by itself may make the opening movement of the shutter blade elements less sensitive to frictional force variations; however, the increased shutter blade speed will also limit the depth of field which could otherwise be achieved.

It is an object of this invention to provide an exposure control system featuring a pair of movable shutter blade elements having respective light admitting apertures therethrough which overlap in a manner defining an effective aperture wherein shutter blade movement toward an effective open aperture may be determined at a uniform rate without effecting the rapid closing of the shutter blade elements.

It is another object of this invention to provide an exposure control system for a photographic apparatus wherein the exposure control system is of the type embodying at least a pair of shutter blade elements movable in correspondence with each other by a walking beam wherein means are included for selectively presenting an inertial characteristic to the walking beam when moved from its light blocking position to a maximum effective aperture defining position.

It is an additional object of this invention to provide an exposure control system for a photographic apparatus wherein the various components of the exposure control system are automatically returned to their initial position in readiness for the commencement of a subsequent photographic cycle.

Other objects of the invention will in part be obvious and will in part appear hereinafter. The invention accordingly comprises the mechanism and system possessing the construction combination of elements and arrangement of parts which are simplified in the following detailed disclosure.

SUMMARY OF THE INVENTION

The invention herein described and claimed relates to an exposure control system and mechanism for a photographic camera apparatus of the type defining a film plane and including a housing and an objective lens mounted on the housing. The exposure control system includes blade means together with means for selectively moving the blade means between a first arrangement wherein the blade means precludes scene light from reaching the film plane and a second arrangement wherein the blade means defines a maximum aperture size through which the scene light may reach the film plane. The blade means also serve to define a range of progressively increasing sized apertures as it moves from its first arrangement to its second arrangement. There are also included means for presenting a relatively high inertial characteristic to the moving means as the moving means moves the blade elements from its first arrangement toward its second arrangement to impart a slower aperture opening movement to the blade means than would otherwise occur. The presenting means also operate to automatically present a relatively low inertial characteristic to the moving means as the moving means moves the blade means away from its second arrangement towards its first arrangement, in this manner allowing aperture closing movement of the blade means substantially uninhibited by the high inertial characteristic. The inertial characteristic presenting means also operates to automatically present the relatively high inertial characteristic to the moving means whenever the moving means is again caused to move the blade means from its first arrangement to its second arrangement.

The moving means includes a rotatably mounted member arranged to be rotated in a first direction as the moving means moves the blade means from its first arrangement to its second arrangement and to be rotated in the opposing direction as the moving means moves the blade means from its second arrangement to its first arrangement. The inertial characteristic presenting means also includes an inertial member mounted for rotation in correspondence with the moving means member.

BRIEF DESCRIPTION OF THE DRAWINGS

The novel features that are considered characteristic of the invention are set forth with particularity in the appended claims. The invention itself, however, both to its organization and its method of operation, together with other objects and advantages thereof, will be best understood from the following description of the illustrated embodiment or when read in connection with the accompanying drawings or when like members have been employed in the different figures to note the same parts and wherein:

FIG. 3 is a cross-sectional front view showing a different operational mode for the inertially influenced exposure control system of FIG. 2; and FIG. 4 is a cross-sectional front view showing still another operational mode for the inertially influenced exposure control system of FIG. 3.

DESCRIPTION OF THE PREFERRED EMBODIMENT

Figure 1:
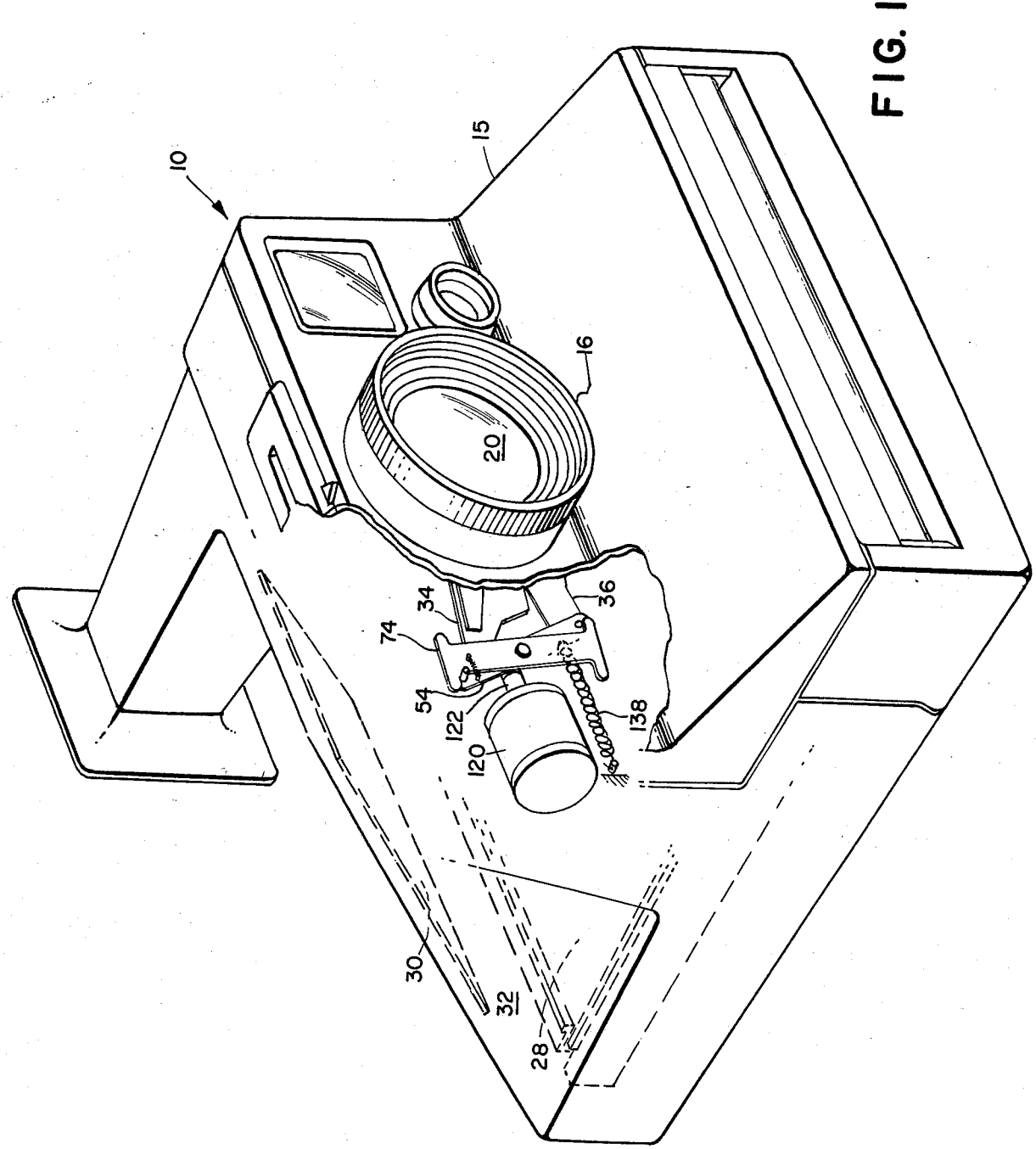
FIG. 1 is a perspective view, partly cutaway, of a camera apparatus embodying the inertially influenced exposure control system of this invention.

Referring now to FIG. 1, it can be seen that the exposure control system of this invention is disposed within an exposure housing 10 comprising a rear casting 12 selectively machined to support the components of the exposure mechanism. Surrounding the front and top of the casting 12 there may be provided a cover 15 which includes at least one opening through which protrudes a manually adjustable focus bezel 16. The central portion of the rear casting 12 includes a light entering exposure opening 22 which defines the maximum available exposure aperture for the system.

An objective or taking lens 20 is provided in overlying relation to the light entering opening 22 wherein the objective lens 20 may comprise a plurality of elements retained in predetermined spaced relation by a cylindrical lens mount assembly 24 which is externally threaded for toothed engagement with the internally threaded focus bezel 16. Bezel 16 is made rotatable with respect to the front cover 15 to provide translational movement of the elements of lens 24 along a central optical axis 26 of the optical path of the housing 10. As is readily apparent, the center optical axis 26 of the optical path is illustrated as being normal to the plane of the drawing in FIGS. 2–4. The rotation of focus bezel 16 may be carried out by manual rotation to provide displacement of the elements of objective lens 20 for focusing of image carrying rays through the light entering exposure opening 22 to a rearwardly positioned film plane 28 by way of a reflecting mirror 30 when the system is embodied in a suitable film exposure chamber 32. Immediately behind the objective lens 20 in light entering exposure opening 22 there are supported two overlapping shutter blade elements 34 and 36 which will be subsequently described in greater detail herein. Extending from the top of the housing 10 is a shutter release button, not shown, the depression of which causes the commencement of an exposure cycle.

A pair of scene light admitting primary apertures 38 and 40 are provided respectively in the blade elements 34 and 36 to collectively define a progressive variation of effective aperture openings in accordance with longitudinal and lateral displacement of one blade element with respect to the other blade element in a manner fully described in a U.S. Pat. application entitled "Camera with Pivoting Blades" by George D. Whiteside, filed July 2, 1974, and assigned in common herewith. The apertures 38 and 40 are selectively shaped so as to overlap the light entering exposure opening 22 thereby defining a gradually varying effective aperture size as a function of the position of blades 34 and 36. Each of the blades, 34 and 36, may additionally be configured to have corresponding photocell sweep secondary apertures shown respectively at 42 and 44.

Secondary apertures 42 and 44 may be configured in correspondence with the shapes of scene light admitting primary apertures 34 and 36. As is readily apparent, the secondary apertures 42 and 44 also move in correspondence with the primary apertures 34 and 36 to define a small secondary effective aperture for admitting the passage of light from the scene being photographed to a light detection station generally at 46. The light detecting station 46 includes a light sensitive circuit having both a photocell and control circuit, not specifically shown, which collectively operate to terminate an exposure interval as a function of the amount of light received through the secondary effective aperture as defined by the overlapping photocell sweep apertures 42 and 44. An exposure control mechanism embodying a light detecting station of the above described type is shown in more detail and claimed in a U.S. Patent entitled "Exposure Control System" by V. K. Eloranta, No. 3,641,889.

Projecting from the rear casting 12 at a location spaced laterally apart from the light entering exposure opening 22 is a pivot pin or stud 48 which pivotally and translatively engages elongated slots 50 and 52 formed in respective shutter blades elements 34 and 36. Pin 48 may be integrally formed with the rear casting 12 and blade elements 34 and 36 may be retained in engaging relation with respect to the pin 48 by any suitable means such as peening over the outside end of pin 48.

The opposite ends of the blade elements 34 and 36 respectively include extended portions which pivotally connect to a walking beam 54. The walking beam 54 is pivotally connected at its distal ends to the shutter blade elements 34 and 36 by respective pin members 56 and 58 which extend laterally from the walking beam 54. Pin members 56 and 58 are preferably circular in cross section and extend through respective circular openings 60 and 62 in respective blade elements 34 and 36 so as to slidably engage respective arcuate recesses 64 and 66 which are integrally formed within the rear casting 12. The arcuate recesses 64 and 66 operate to prohibit disengagement of the blade elements 34 and 36 from their respective pin members 56 and 58 during exposure control system operation.

An inertial member, shown generally at 74, is disposed in spaced apart substantially parallel relation with respect to the walking beam 54 for selective rotation in correspondence with the walking beam in a manner to be fully discussed in the following description. The inertial member 74 is disposed for rotation with respect to the rear casting 12 by an elongated pin 76 extending laterally from the rear casting 12 into rotatable engagement with both the walking beam 54 and the inertial member 74. In this manner, walking beam 54 is disposed for rotation about the identical axis as the inertial member 74.

The inertial member 74 also includes integral side portions 78 and 80 which extend radially outward of the pin 76, in substantially parallel relation to the longitudinal sides of the walking beam 54, to respective weighted portions shown generally at 82 and 84 at the outside ends thereof. The walking beam 54 additionally includes a pin 85 extending laterally outward therefrom so as to engage the outer edge portion of the inertial member 74. Thus, the edge of the inertial member 74 can be engaged by the pin 85 extending from the walking beam 54 in a manner to be subsequently described.

The inertial member 74 is urged to rotate in a counterclockwise direction as a function of walking beam 54 rotation in a counterclockwise direction by means of a tension spring 110, one end of which engages the walking beam 54 at an integral pin 114 extending laterally from the walking beam 54. The other end of the tension spring is connected to the inertial member 74 by another integral pin 116 extending laterally from the inertial member.

A tractive electromagnetic device in the form of a solenoid 120 is employed to displace the shutter blades 34 and 36 with respect to each other and the rear casting 12. The solenoid 120 may be of conventional design carrying an internally disposed cylindrical plunger unit 122 which retracts inwardly into the body of the solenoid upon energization thereof. The solenoid plunger unit 120 is affixed to the walking beam 54 by means of an elongated vertical guideway 124 at the outward end of the plunger 122 which guideway slidably engages a pivot pin 130 extending laterally from the walking beam 54. In this manner, longitudinal displacement of the plunger unit 122 will operate to rotate the walking beam 54 about its center axis of rotation so as to appropriately displace the shutter blade elements 34 and 36.

The blade elements 34 and 36 are continuously urged into positions defining the largest effective aperture over the light entry exposure opening 22 by a biasing tension spring 138. The movable end of spring 138 engages a pin 136 extending laterally outward of the walking beam 54 while the stationary end of spring 138 is grounded with respect to the rear casting 12.

With the spring connection herein described, the exposure control mechanism of this invention is biased into a normally opened orientation and the shutter blade elements 34 and 36 are drawn to their closed position only while solenoid 120 is energized. Consequently, energization of the solenoid 120 prevents the shutter blades 34 and 36 from moving toward their maximum aperture opening under the urging of spring 138. However, as should be readily understood the exposure control mechanism of this invention would be equally applicable to photographic systems where the blades 34 and 36 are spring biased in a normally closed position.

The exposure control system is herein described in relation to a photographic camera of the non-single lens reflex type although the intended scope of the invention is by no means so limited and cameras of the well known reflex type as described in U.S. Pat. No. 3,672,281 entitled, "Reflex Camera" by E. H. Land may be equally suitable for embodying the exposure control system of this invention.

The shutter blade elements 34 and 36 are drawn and held at their closed position against the bias of spring 138 only while the solenoid 120 is energized.

The following photographic cycle of operation respecting the exposure control system of this invention is described in regard to a camera of the non-single lens reflex type wherein the viewfinder does not have a through the lens viewing and focusing capability. The scope of invention, however, is by no means so limited and would be applicable to cameras of the single lens reflex type as previously discussed. An ambient photographic cycle is commenced upon the depression of a start button (not shown) which effects the deactuation of solenoid 120. Tension spring 138 thereafter operates to rotate walking beam 54 in a clockwise direction as viewed from the front of the exposure housing 16. Upon clockwise rotation, the pin 85 at tip of the walking beam 54 engages the edge wall of the inertial member 74 so as to rotate the inertial member 74 in a clockwise direction in concert with the walking beam 54. As is readily apparent, clockwise rotation of the walking beam 54 operates to move the shutter blade elements 34 and 36 in directions which progressively enlarge the effective aperture over the light entering exposure opening 22. The rotation of walking beam 56 also effects simultaneous sliding and pivoting of the shutter blade elements 34 and 36 about pivot pin 48 in a well known manner. Simultaneously, photocell sweep secondary apertures 42 and 44 define a corresponding progressively enlarging aperture opening over the photocell.

When an appropriate amount of light is received to trigger the light sensitive control circuit, solenoid 120 is again energized to rapidly close the blade elements 34 and 36 thereby terminating an exposure interval. Should the shutter blade elements 34 and 36 reach their maximum aperture defining position prior to the appropriate amount of light being received to trigger the light sensitive control circuit, then the blades would be halted until such time as the appropriate amount of light is received.

Figure 2:
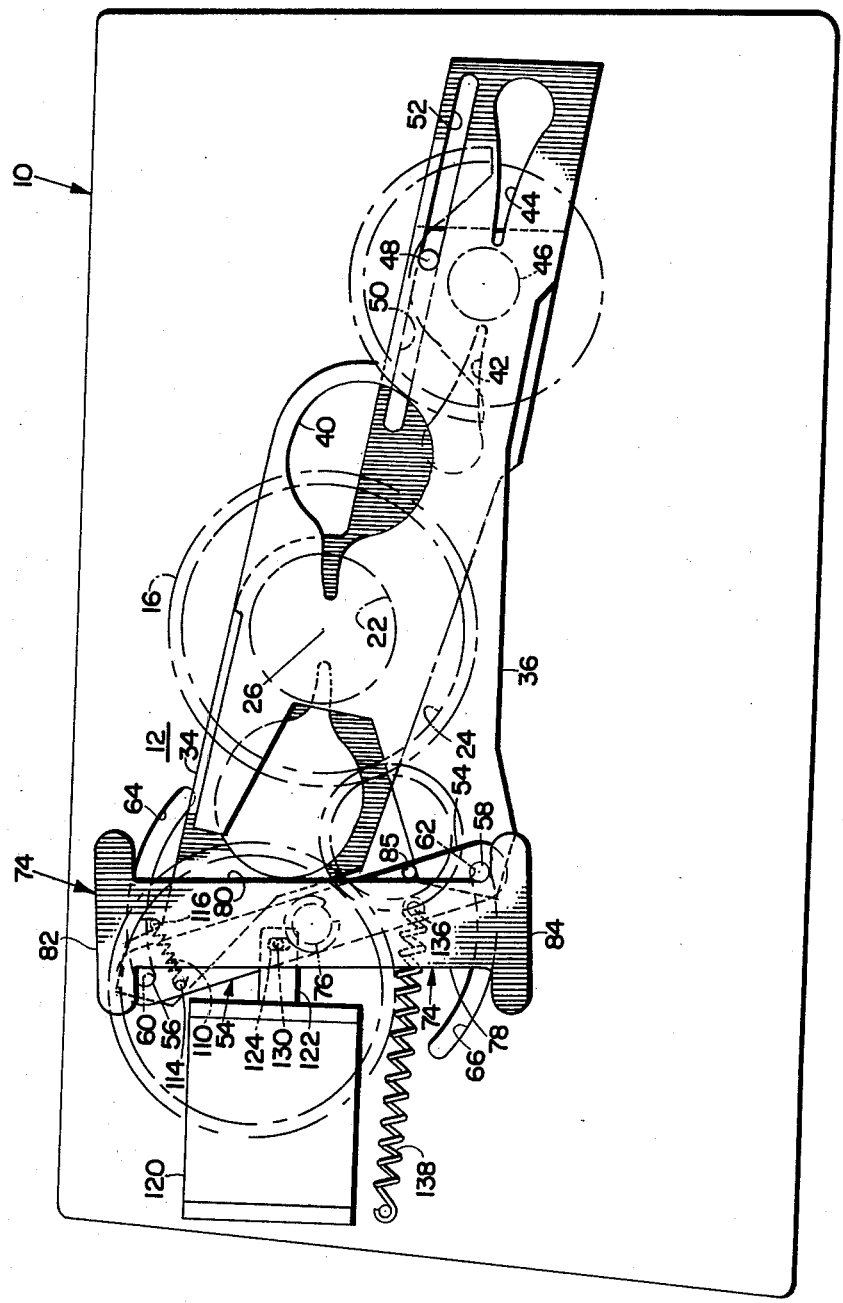
FIG. 2 is a cross-sectional front view of the inertially influenced exposure control system of the photographic apparatus of FIG. 1.

When the appropriate amount of light is received to trigger the light sensitive control circuit, the walking beam 54 is disengaged from the inertial member 74 and rotated in the counterclockwise direction towards the closed position as shown in FIG. 3. The inertial member 74, after being disengaged by the walking beam 54, remains stationary for a period of time during which the force of the spring 110 is increased by the counterclockwise rotation of the walking beam 54. The output force characteristic of the tension spring 110 is thus increased until adequate to overcome the static momentum of the inertial member 74, at which point the inertial member 74 is also rotated in a counterclockwise direction so as to relieve the tension spring 110. In this manner, the inertial member 74 is returned to the position as shown in FIG. 2.

It will therefore be appreciated by referring to FIG. 3 that the aperture blade elements 34 and 36 are first rotated to their closed position entirely blocking the light entering exposure opening 22, after which the solenoid 120 remains energized to maintain the walking beam 54 in its extreme counterclockwise position until the inertial member 74 can be returned to its extreme counterclockwise position. The exposure control system is thus reset to accommodate a subsequent photographic cycle as may be commenced with the depression of the start button to deactuate the solenoid.

Thus, it can now be appreciated that the inertial characteristic of the member 74 is presented to the walking beam 54 when the walking beam is rotated in a clockwise direction to move the shutter blade elements 34 and 36 in the direction of progressively enlarging effective aperture over the light entering exposure opening 22. Conversely, counterclockwise rotation of the walking beam 54 in the dirrection moving the shutter blade elements 34 and 36 to progressively decrease the effective aperture over the light entering exposure opening 22 disengages the walking beam 54 from the inertial member 74 so that the walking beam 54 may be rapidly rotated by the solenoid 120 without having to overcome the inertial characteristic of the member 74. The inertial member 74 is subsequently returned to its initial position as a result of the walking beam 54 increasing the output force characteristic of the tension spring 110. In this manner, only the opening speed of the shutter blade elements 34 and 36 is influenced as a function of the inertial characteristic of the member 74 while the closing speed may be effected quickly without the inertial influence of the member 74. Utilization of the inertial member 74 in this manner permits the use of a tension spring 138 having a higher output force characteristic than would otherwise be possible while still maintaining the required rate of effective aperture opening.

Theoretically, it would be possible to utilize a lighter spring than that shown at 138 and entirely eliminate the inertial member 74 to achieve the required rate of shutter blade opening as previously discussed; however, the use of such a light spring would make the rate at which the shutter blade elements 34 and 36 open substantially more sensitive to the influence of variations in the frictional forces between individual moving components. Thus, the use of a light spring to achieve the required rate of shutter blade movement is entirely unsatisfactory due to the difficulty in achieving a uniform rate of shutter blade movement. The exposure control arrangement of this invention overcomes this disadvantage by utilizing a substantially heavier spring 138 having a higher output force characteristic than would otherwise be possible while still achieving the desired slow rate of shutter blade movement. The inertial member 74 is selectively presented for movement in correspondence with the walking beam 54 during opening movement of the shutter blade elements 34 and 36 to reduce the speed of shutter blade movement to the desired rate while automatically disengaging from the walking beam 54 to permit the last closing of the shutter blade elements. It should also be appreciated that the inertial member 74 is automatically returned to its initial position in readiness for the initiation of a subsequent photographic cycle.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. Apparatus for a camera of the type defining a film plane and including a housing and an objective lens mounted on the housing, said apparatus comprising:

blade means;

means for selectively moving said blade means between a first arrangement wherein said blade means precludes scene light from reaching the film plane and a second arrangement wherein said blade means defines a maximum aperture size through which scene light may reach the film plane, said blade means serving to define a range of progressive increasing sized apertures as it moves from its said first arrangement to its said second arrangement and including a displaceably mounted member arranged to be displaced in a first direction as said moving means moves said blade means from its said first arrangement to its said second arrangement and to be displaced in a second direction as said moving means moves said blade means from its said second arrangement to its said first arrangement; and means for presenting a relatively high inerial characteristic to said moving means as said moving means moves said blade means from its said first arrangement toward its said second arrangement to impart a slower aperture opening movement to said blade means than would otherwise occur and for automatically presenting a relatively low inertial characteristic to said moving means as said moving means moves said blade means away from its said second arrangement towards its said first arrangement to permit an aperture closing movement of said blade means substantially uninhibited by said high inertial characteristic, said inertial characteristic presenting means including an inertial member mounted for displacement in correspondence with said displaceably mounted member and a first spring directly connecting said inertial member and said displaceably mounted member, said displaceably mounted member drivingly engaging said inertial member as it moves in said first direction and said spring permitting said displaceably mounted member to move away from said inertial member as said displaceably mounted member moves in said second direction while subsequently causing said inertial member to move into contact with said displaceably mounted member so that said inertial characteristic presenting means operates to automatically present said relatively high inertial characteristic to said moving means whenever said moving means is again caused to move said blade means from its said first arrangement to its said second arrangement.

2. The apparatus of claim 1 wherein said blade means includes at least two blade elements movable along a predetermined path and said displaceably mounted member interconnects at least two of said blade elements for movement in correspondence with each other, said displaceably mounted member being disposed for rotation relative to the housing about a select axis substantially perpendicular to said predetermined path and wherein said inertial member is also disposed for rotation about said select axis in a manner whereby rotation of said displaceably mounted member in a direction operating to move said blade elements from said first arrangement toward said second arrangement in the direction of progressively increasing sized apertures operates to simultaneously engage said inertial member at an initial position and to rotate said inertial member from said initial position about said select axis whereupon subsequent rotation of said displaceably mounted member in the opposing direction to move said blade elements back toward said first arrangement operates to simultaneously disengage said displaceably mounted member from said inertial member so that said inertial member can be rotated back to its initial position by said spring means.

3. The apparatus of claim 2 wherein said displaceably mounted member connects at the opposing ends thereof to respective blade elements and said inertial member includes a portion thereof in overlapping relation with respect to the locus of travel through which said displaceably mounted member rotates so as to be engaged and rotated by said displaceably mounted member upon rotation thereof in a direction operating to move said blade elements from said first arrangement toward said second arrangement whereas rotation of said displaceably mounted member in the opposing direction to move said blade elements toward said first arrangement operates to disengage said inertial member from said overlapping portion of said displaceably mounted manner.

4. The apparatus of claim 2 in which the blade means comprise two blade elements having respective apertures therethrough wherein said apertures may be simultaneously moved over the objective lens by said moving means to define said range of progressively increasing sized apertures as said blade elements are moved from said first arrangement toward said second arrangement.

5. The apparatus of claim 1 wherein the means for selectively moving said blade means include a second spring in driving connection to said displaceably mounted member so as to urge said displaceably mounted member in said first direction together with an electromagnetic device selectively operable to drive said displaceably mounted member in the second direction against the bias of said second spring.

6. The apparatus of claim 1 whereby the return movement of said displaceably mounted member in said second direction operates to increase the force of said first spring until the inertia of said inertial member is overcome so as to permit said first spring to return said inertial member to its initial position subsequent to said first member returning to its position corresponding with said first arrangement in said blade means.

7. Apparatus for a camera of the type defining a film plane and including a housing and an objective lens mounted on the housing, said apparatus comprising:
blade means including at least two blade elements;
means for selectively moving said blade means between a first arrangement wherein said blade means precludes scene light from reaching the film plane and a second arrangement wherein said blade means defines a maximum aperture size through which scene light may reach the film plane, said moving means including a beam member pivotally connecting said blade elements at respective spaced apart points thereon together with means for pivotally connecting said beam member with respect to the housing at a pivot point on said member intermediate said spaced apart points of pivotal connection to said blade elements so that pivotal movement of said blade member about its point of pivotal connection with respect to the housing operates to drive said blade members in generally opposing directions to define a range of progressively increasing sized apertures as said blades move from said first arrangement to said second arrangement; and means for presenting a relatively high inertial characteristic to said moving means as said moving means moves said blade means from its said first arrangement towards its said second arrangement to impart a slower aperture opening movement to said blade means than would otherwise occur and for automatically presenting a relatively low inertial characteristic to said moving means as said moving means moves said blade means away from its said second arrangement toward its said first arrangement to permit an aperture closing movement of said blade means substantially uninhibited by said high inertial characteristic, said inertial characteristic presenting means including an inertia member having at least some portion thereof disposed in intercepting relation with respect to the path of pivotal movement of said beam member together with means for mounting said inertia member to accommodate displacement thereof in correspondence with said pivoting movement of said beam member from a select position with respect to the housing so that said beam member engages said inertia member at said select position as said beam member moves said blade means from its said first arrangement towards its said second arrangement and automatically withdraws from engagement with said inertia member as it moves said blade means away from its said second arrangement towards its said first arrangement, said inertial characteristic presenting means additionally including resilient means for automatically returning said inertia member to its said select position to accommodate the presentation of said relatively high inertial characteristic to said moving means whenever said moving means is again caused to move said blade means from its said first arrangement to its said second arrangement.

8. The apparatus of claim 7 wherein said pivotal movement of said beam member defines a plane substantially parallel with respect to the plane defined by said inertia member displacement to define a compact arrangement.

9. Apparatus of claim 8 wherein said means for mounting said inertia member includes pivot means for mounting said inertia member for pivotal movement about a point coaxial with said point of beam member pivoting.

* * * * *